US009378361B1

(12) United States Patent
Yen et al.

(10) Patent No.: US 9,378,361 B1
(45) Date of Patent: Jun. 28, 2016

(54) ANOMALY SENSOR FRAMEWORK FOR DETECTING ADVANCED PERSISTENT THREAT ATTACKS

(71) Applicant: EMC Corporation, Hopkinton, MA (US)

(72) Inventors: Ting-Fang Yen, Cambridge, MA (US); Ari Juels, Brookline, MA (US); Aditya Kuppa, Bangalore (IN); Kaan Onarlioglu, Brookline, MA (US); Alina Oprea, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 245 days.

(21) Appl. No.: 13/731,635

(22) Filed: Dec. 31, 2012

(51) Int. Cl.
G06F 21/55 (2013.01)
H04L 29/06 (2006.01)
G06F 21/56 (2013.01)

(52) U.S. Cl.
CPC ............. *G06F 21/55* (2013.01); *G06F 21/552* (2013.01); *G06F 21/566* (2013.01); *H04L 63/14* (2013.01); *H04L 63/1408* (2013.01); *H04L 63/1416* (2013.01); *H04L 63/1425* (2013.01); *G06F 21/562* (2013.01)

(58) Field of Classification Search
CPC . H04L 63/14; H04L 63/1408; H04L 63/1416; H04L 63/1425; G06F 21/55; G06F 21/566; G06F 21/56; G06F 21/562
See application file for complete search history.

(56) References Cited

U.S. PATENT DOCUMENTS

| 8,402,543 | B1 * | 3/2013 | Ranjan | H04L 63/1416 709/223 |
| 8,555,388 | B1 * | 10/2013 | Wang | H04L 63/1416 709/245 |
| 8,793,790 | B2 * | 7/2014 | Khurana | G06F 21/552 726/1 |

(Continued)

FOREIGN PATENT DOCUMENTS

| CN | 102594625 A | 7/2012 |
| WO | 2013014672 A1 | 1/2013 |
| WO | WO 2013/014672 | * 1/2013 |

OTHER PUBLICATIONS

Curry et al. "Mobilizing Intelligent security opeartions for advanced persistent threats", Feb. 2011, pp. 1-17 http://www.emc.com/collateral/industry-overview/11313-apt-brf.pdf.*

(Continued)

*Primary Examiner* — Ali Abyaneh
*Assistant Examiner* — Carlos M De Jesus Lassala
(74) *Attorney, Agent, or Firm* — BainwoodHuang

(57) ABSTRACT

A threat detection system for detecting threat activity in a protected computer system includes anomaly sensors of distinct types including user-activity sensors, host-activity sensors and application-activity sensors. Each sensor builds a history of pertinent activity over a training period, and during a subsequent detection period the sensor compares current activity to the history to detect new activity. The new activity is identified in respective sensor output. A set of correlators of distinct types are used that correspond to different stages of threat activity according to modeled threat behavior. Each correlator receives output of one or more different-type sensors and applies logical and/or temporal testing to detect activity patterns of the different stages. The results of the logical and/or temporal testing are used to generate alert outputs for a human or machine user.

27 Claims, 6 Drawing Sheets

(56) References Cited

U.S. PATENT DOCUMENTS

| | | | | |
|---|---|---|---|---|
| 2008/0148398 A1* | 6/2008 | Mezack | ............... | G06F 21/55 726/22 |
| 2011/0153811 A1* | 6/2011 | Jeong | ............... | H04L 63/14 709/224 |

OTHER PUBLICATIONS

Giura et al., "Using Large Scale Distributied Computing to Unveil advanced Persistent Threats", Nov. 2012 (document proporties), pp. 1-13 http://web2.research.att.com/techdocs/TD_101075.pdf.*

Curry et al. "Mobilizing Intelligent security opeartions for advanced persistent threats", Feb. 2011, pp. 1-17 http://www.emc.eom/collateral/industry-overview/11313-apt-brf.pdf.*

Giura et al., "Using Large Scale Distributied Computing to Unveil advanced Persistent Threats", Nov. 2012 (document properties), pp. 1-13 http://web2.research.att.com/techdocs/TD_101075.pdf.*

Pantola et al., "Normalization of Logs for Networked Devices in a Security Information Event Management System", Nov. 2009 (document properties), pp. 1-6 http://justinspeaks.files.wordpress.com/2010/10/device-normalizer-paper.pdf.*

Lunt et al., "A Real-Time Intrusion-Detection Expert System (IDES)", Feb. 1992, pp. 1-166, http://www.csl.sri.com/papers/9sri/9sri.pdf.*

* cited by examiner

ANOMALY SENSOR FRAMEWORK FOR DETECTING ADVANCED PERSISTENT THREAT ATTACKS

BACKGROUND

The invention relates the field of computer system security.

Computer systems are vulnerable to various kinds of attacks or threats, including so-called "advanced persistent threats" or APTs which can be very sophisticated and dangerous from a security perspective. The term APT generally refers to an attacker having capabilities and resources to persistently target a specific entity, along with the techniques they use including malware that infects a system under attack. An APT may be capable of locating and taking harmful action with respect to sensitive data in a computer system, such as copying confidential data to an external machine for criminal or other ill-intended activities. The APT performs its tasks in a stealthy manner so as to avoid detection. In some cases, an APT may be active in a system for a very long period of weeks or months and create corresponding levels of damage.

It is desirable to protect computer systems and their data from threats such as APTs. Among the mechanisms that can be utilized are detection mechanisms for detecting the presence of an APT in a computer system. Generally, any malware that has entered a system can only be removed or disabled after it has first been identified in some manner. Identification in turn requires detection, i.e., acquiring knowledge indicating possible or actual presence of an APT or similar threat in a protected system.

SUMMARY

The detection of APTs and similar threats in protected computer systems has relied upon human security specialists who have experience with the threats and can interrogate a protected system for operational information that may be indicative of APT presence. Generally such a security specialist is looking for patterns of known bad activities, such as communications logs identifying an external host known or suspected to be used or controlled by computer criminals. The process can be labor-intensive, difficult to generalize, and non-scalable. Existing anomaly detection schemes commonly focus on very obvious anomalies such as volume-based outliers, but these are ill-suited for "low-and-slow" APT attacks and also suffer from high false positive rates.

A presently disclosed technique for threat detection is both automated and sufficiently sophisticated to detect the more subtle operation signatures presented by APTs and similar threats. The technique is based partly on a hypothesis that, however stealthy an attacker might be, its behavior in attempting to steal sensitive information or subvert system operations should be different from that of a normal, benign user. Moreover, since APT attacks typically include multiple stages, e.g., exploitation, command-and-control, lateral movement, and objectives, each move by an attacker provides an opportunity to detect behavioral deviations from the norm. Correlating events that may otherwise be treated as independent can reveal evidence of an intrusion, exposing stealthy attacks in a manner not possible with previous methods.

The technique includes use of detectors of behavioral deviations referred to as "anomaly sensors", where each sensor examines one aspect of hosts' or users' activities. For instance, a sensor may examine the external sites hosts contact to identify unusual connections (potential command-and-control channels), to profile the machines each user logs into to find anomalous access patterns (potential "pivoting" behavior in the lateral movement stage), to study users' regular working hours to flag suspicious activities in the middle of the night, or to track the flow of data between internal hosts to find unusual locations where large amounts of data are being gathered (potential staging servers before data exfiltration).

More particularly, a computer system realizes a threat detection system for detecting threats active in a protected computer system. The system includes a set of anomaly sensors of distinct types including user-activity sensors, host-activity sensors and application-activity sensors, with each sensor being operative (1) to build a history of pertinent activity over a training period of operation, and (2) during a subsequent detection period of operation, compare current activity to the history of pertinent activity to detect new activity not occurring in the training period. The new activity is identified in respective sensor output. The system further includes a set of correlators of different distinct types corresponding to different stages of threat activity according to modeled threat behavior. Each correlator receives output of one or more sensors of different types and applies logical and/or temporal testing to received sensor outputs to detect activity patterns of the different stages. Each correlator uses results of the logical and/or temporal testing to generate a respective alert output for a human or machine user of the threat detection system.

While the triggering of one sensor indicates the presence of a singular unusual activity, the triggering of multiple sensors suggests more suspicious behavior. A framework is used in which templates are defined by a human analyst for the correlations implemented by the correlators. The human analyst is given the flexibility of combining multiple sensors according to known attack patterns (e.g., command-and-control communications followed by lateral movement), to look for abnormal events that warrant investigation, or to generate behavioral reports of a given user's activities across time.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
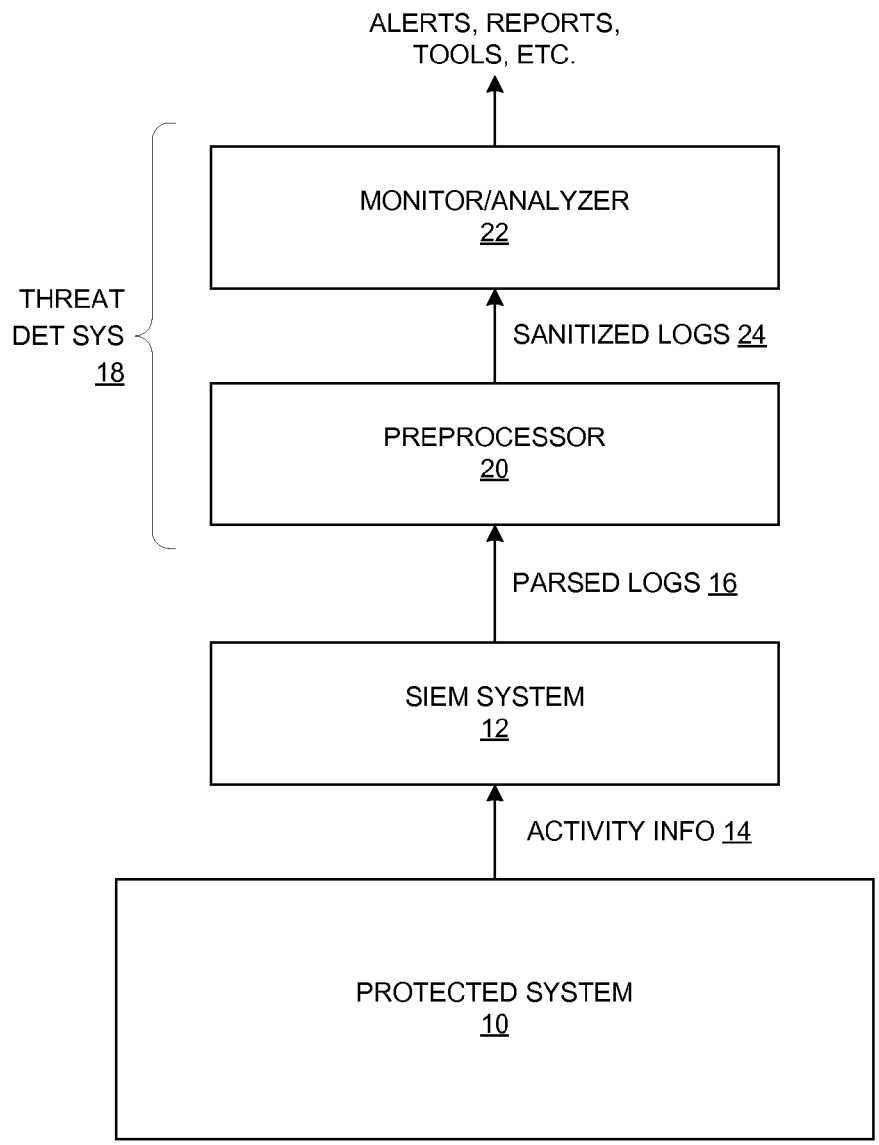
FIG. 1 is a block diagram of a computer system.

FIG. 1 shows a computing system augmented by monitoring and/or protection elements. In particular, the system includes a protected distributed computing system (PROTECTED SYSTEM) 10 and a security information and event management (SIEM) system 12 continually receiving a wide variety of system activity information 14 from operational components of the protected system 10. The SIEM system generates parsed logs 16 of logged activity information which are provided to a threat detection system 18 including a preprocessor 20 and a monitor/analyzer 22. The preprocessor 20 generates sanitized logs 24 for use by the monitor analyzer 22, which in turn provides user-level functionality to a separate human or machine user, the functionality including things like alerts, reports, interactive tools for controlling or augmenting operations, etc.

The protected system 10 is generally a wide-area distributed computing system, such as a large organizational network. It may include one or more very large datacenters, as well as a number of smaller or "satellite" datacenters, all interconnected by a wide-area network that may include public network infrastructure (Internet) along with private networking components such as switches and routers, firewalls, virtual private network (VPN) components, etc. Each datacenter includes local resources such as server computers (servers), client computers and storage systems, coupled together using local/intermediate networks such as local-area networks (LANs), metro-area networks (MANs), storage-area networks (SANs), etc.

The SIEM system 12 is a specialized computing system including hardware computing components executing specialized SIEM software components, including a large database for storing the parsed logs 16. The SIEM system 12 receives raw logs (not shown) generated by logging devices in the system and performs basic parsing into fields (e.g. IP address, timestamp, Msg ID, etc.) to produce the parsed logs 16. In one embodiment the SIEM system may utilize a SIEM product known as enVision™ sold by RSA Security, Inc., the security division of EMC Corporation. The SIEM system 12 gathers the raw logs generated by different devices within the protected system 10 and stores the parsed logs 16 in the database, functioning as a centralized repository. The logs 16 need to be stored for some period of time (e.g., at least several months) in order to enable the analysis described herein.

The threat detection system 18 may be primarily software-implemented, utilizing hardware resources of the SIEM system 12 or in some cases its own dedicated hardware computers. The threat detection system 18 is described herein as a collection of functional components. As described below, these are to be understood as one or more general-purpose computers executing specialized software for realizing each function.

The major component of the threat detection system 18 is the monitor/analyzer 22. As described more below, it employs both top-down and bottom-up components. The top-down component builds and utilizes templates based on known information about current and prior APT attacks, and these templates are used in analysis for detecting behavior that may be indicative of such attacks. The bottom-up component gathers, stores and processes the system activity information as reflected in the sanitized logs 24 from the preprocessor 20.

Figure 2:
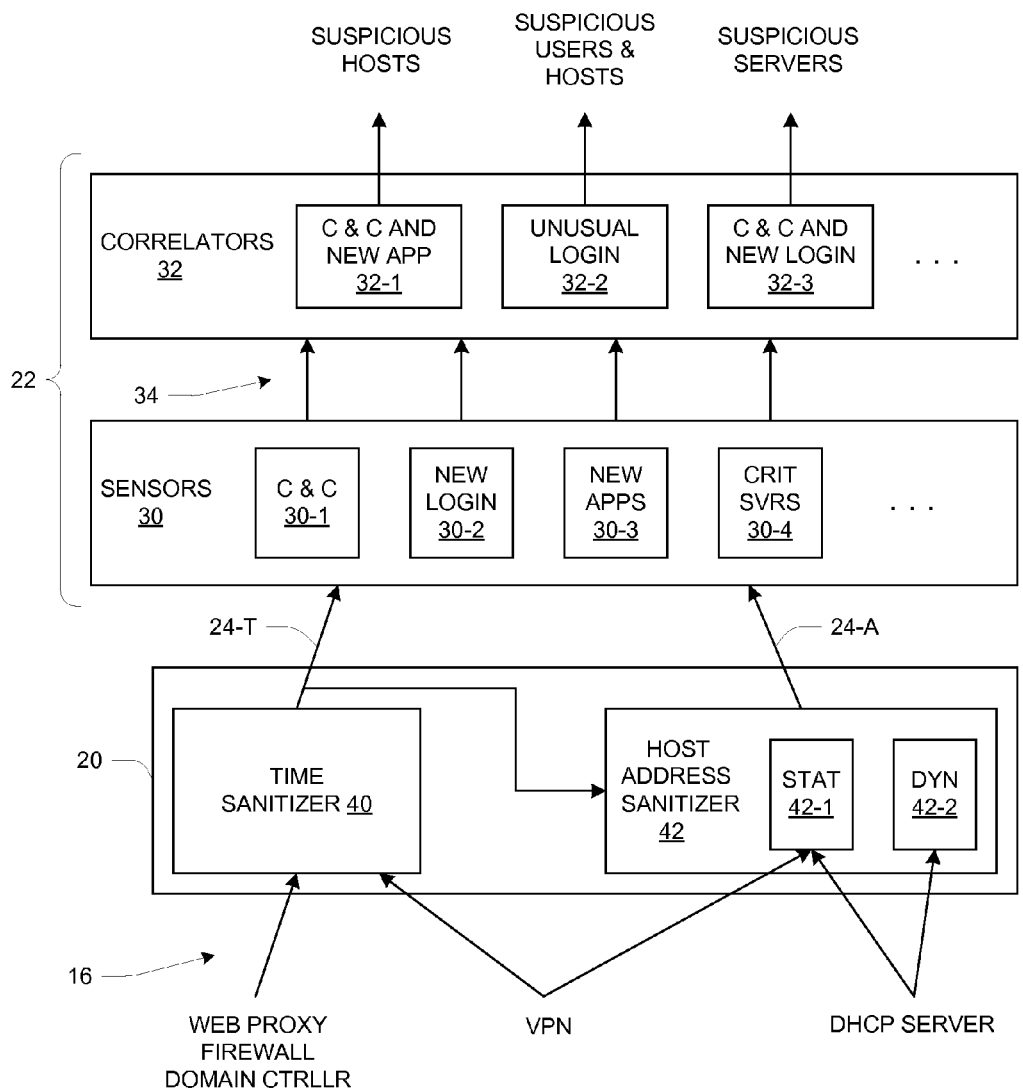
FIG. 2 is a detailed block diagram of a threat detection system.

As shown in FIG. 2, the monitor/analyzer 22 includes sensors 30 and correlators 32. Various types of sensor 30 are deployed, including for example a command-and-control (C & C) sensor 30-1, new login sensor 30-2, new applications sensor 30-3 and critical servers sensor 30-4. The correlators 32 work from sensor output in the form of reports 34. Examples of correlators 32 include C & C and new application correlator 32-1, unusual login correlator 32-2 and C & C and new login correlator 32-3. Functions of these elements are described below.

Because of inconsistencies in the parsed logs 16 (out-of-order events, time skew, missing events, etc.), the log data needs to be processed and sanitized before any analysis is attempted. To this end, the preprocessor 20 includes a time sanitizer 40 and a host address sanitizer 42. The host address sanitizer 42 includes a first sanitizer (STAT) 42-1 for static host addresses and a second sanitizer (DYN) 42-2 for dynamic host addresses. Example parsed log inputs 16 are shown, including logs from web proxies, firewalls, domain controllers, VPN components, and Dynamic Host Control Protocol (DHCP) servers. Specific aspects of the preprocessor 20 are described below.

Regarding the above-mentioned top-down component, it may utilize published information about current and past APT attacks (documented in existing literature) as well as human analyst experience. This information is used to build templates for APT detection. Template definition and deployment may be based on an assumed model for APT attacks. In one model, a typical APT attack consists of the following stages: 1) Exploitation, 2) Command-and-control (C& C), 3) Lateral movement, and 4) Objectives (e.g., data exfiltration, service disruption). Exploitation refers to a threat's entering a system at points of vulnerability. Command and control refers to a resident threat's communications with the attacker (e.g. to receive new attack directives or to report back the results) and operations in the system, such as gathering sensitive data. Lateral movement refers to propagation or migration of threat components/activities within a system, and objectives refers to activities that provide the desired data or other results from operation of the threat.

Starting from the general APT model, different classes of attacks can be defined and the classes used to guide template creation. Examples of attack classes include attackers that propagate through social media, attackers that gather data to a central location and exfiltrate the data, attackers that exfiltrate from multiple machines in the enterprise. Templates for such different classes of attack can be built and deployed for use. The templates can also be refined during use as more knowledge is gathered about attacker behavior. Note that instead of utilizing known attack signatures, such as external sites known to be controlled by computer criminals or specific text strings used in known exploits, the disclosed system relies on patterns of attack behavior and hence is more difficult to evade.

The bottom-up component processes and analyzes information in event logs received by the SIEM system 12 in an enterprise and gathers evidence for abnormal user or host behavior as determined by different anomaly detection sensors 30. The bottom-up component generally consists of the following layers:

1. SIEM System 12

The SIEM system 12 gathers logs generated by different devices within an enterprise in a centralized repository, and stores these logs sufficiently long (e.g., at least several months) in order to enable analyses as described herein.

2. Preprocessor 20

Because of log inconsistencies (out-of-order events, time skew, missing events), the data from the parsed logs 16 needs to be processed and sanitized before any analysis is attempted. Below are described three particular processing tools that may be used.

3. Anomaly Sensors 30

The role of individual sensors 30-$x$ is to maintain a history of normal user and host activity in a particular respect, perform profiling related to that aspect of user or host behavior, and generate a report 34 when activity deviating from the typical user or host profile is observed. The following are examples of observable activity, along with the specific sensor 30 involved as well as the model stage in which it occurs:

New destination domains, which may be related to beaconing activity or data exfiltration (C & C sensor 30-1; C & C or data exfiltration stages)

Stealthy scanning or probing (lateral movement stage)

Abnormal VPN login patterns (lateral movement stage),

Abnormal login patterns to internal machines (Login sensor 30-2; lateral movement stage)

Abnormal communication patterns between internal hosts (lateral movement stage)

Activities on a machine when user is not at the terminal (After-hours sensor; lateral movement stage)

Abnormal flow of data between internal hosts, e.g., in terms of volume, which may be indicative of data gathering (Internal-staging sensor; data exfiltration stage)

Users in multiple physical locations at the same time (lateral movement stage)

Executables being downloaded and installed (applications sensor 30-13; exploitation stage)

Each individual sensor 30 may use statistical and machine learning techniques for profiling, and more details are given for several example sensors 30 below. The system is preferably general enough to accommodate new types of sensors 30 being added to the system and/or refinement of existing sensor 30 based on the experience-based feedback.

4. Correlators 32

The reports 34 from multiple sensors 30 are correlated and matched against the attack templates built by the top-down component. An attack template might involve several sensors 30 and could use different operators applied to the reports 34 from the sensors 30 as described below.

5. Alert/Report Generation

Alerts may be triggered from the correlators 32 when suspicious events according to defined templates are detected. The alerts may be provided to a human analyst for further investigation. Alternatively, the correlators 32 may export an application programming interface (API) via which an external machine user can receive alerts and/or reports.

6. Refinement According to Human Feedback

The system preferably allows human analysts evaluating the alerts to give feedback based on the severity of the alerts and the usefulness of the alerts in detecting real attacks. Based on the analyst feedback, the system may undertake continuous refinement. For instance, new sensors 30 may be added, reports generated by various sensors 30 may be refined, alert prioritization may be improved, etc. New templates can also be generated as more attacks are discovered by the human analysts, and in general more knowledge about various attackers is gathered.

One philosophy that may be used in designing the anomaly sensor framework is to make each individual sensor 30 relatively weak or coarse, meaning that it employs a low threshold in selecting event information to be included in its output reports 34, leaving the stronger detection logic for the correlators 32. In this way, generally more lower-level information is obtained that may pertain to a variety of threats both known and unknown, and strong, flexible correlations between sensors 30 can be used to boost the quality of the overall result.

As mentioned, the sensors 30 utilize information from logs collected by the SIEM system 12 (e.g., enVision) in an enterprise environment. These include logs generated by proxy web servers, VPN servers, domain controllers, firewalls and DHCP servers for example. The parsed logs 16 require pre-processing before different event types can be correlated. In particular, it is generally necessary to address inconsistencies arising from dynamic IP address assignments, as well as to develop lists of static IP addresses active in the enterprise. It is also necessary to address inconsistencies in the time-stamping of log data from devices in different time zones and using different time-zone configurations.

To deal with dynamic IP addresses (IPs), it is necessary to develop a consistent mapping between network (IP) addresses and hostnames/MAC addresses. This is done by parsing DHCP and VPN logs as described in more detail below. The outcome of this pre-processing may be stored in a database table with certain fields as shown below. Users can query this table directly. There may also be an interface (e.g., a web form) for accessing this information.

| Column Name | Description |
| --- | --- |
| Start_time | The start timestamp when this IP is allocated to the host. |
| End_time | The end timestamp when this IP is no longer allocated to the host. |
| Ipaddr | The IP address. |
| Hostname | The hostname. |
| Macaddr | The host's MAC address. |

To study hosts that are assigned static IP addresses, IP addresses may be examined that do not appear in DHCP and VPN logs. For example, these IPs may be obtained from security gateway logs and host operating system (e.g., Windows) event logs. The hostname associated with those IP addresses may be looked up (e.g., by reverse DNS resolution using tools such as "nslookup" or "host") repeatedly over time. An IP address that always resolves to the same hostname is considered static.

For time sanitization, the parsed logs 16 are sanitized so that all log entries for all devices are reported in one consistent time, such as UTC time. The sanitization procedure is done by the time sanitizer 40 as described more below.

As mentioned, each of the sensors 30 focuses on a particular aspect of host or user network behaviors. The goal of a sensor 30 is to 1) profile/understand common behaviors during a training period covering a sufficiently long (e.g., at least one or two months) of network activity, and 2) identify outliers during a detection period following the training period. As output, each sensor 30 generates a respective report 34 with an ordered list of alerts (or suspicious behavior) identified during the detection period. The alerts are given a priority and score based on their relevance.

The following are examples of specific types of sensor 30 that may be utilized:

C & C Sensor 30-1

The goal of this sensor 30 is to identify possible C & C (Command-and-Control) domains according to the following heuristics:

Compromised hosts make repeated connections to the C & C domain.

The C & C domain is not contacted by many hosts within the enterprise (the assumption is that APTs keep a low profile).

The C & C domain shows up as a "new" destination that the enterprise hosts do not usually contact.

Analysis may be done using proxy logs of security gateway devices, such as a product known as IronPort®. The C & C sensor 30-1 constructs a history of web domains contacted by each host over a training period (e.g., one or two months). Afterward, a domain is flagged if it shows up in a log but not included in the history. A flagged domain is included in a watch list and actively monitored for some configurable time interval (e.g., one week). If at the end of the week, the activity to this domain looks normal (in terms of connection rate and frequency of domain contact from internal hosts), then the domain is added to the history. Otherwise, the domain is included in the report output of the C & C sensor 30-1.

New Login Sensor 30-2

The goal of this sensor is to identify new login patterns not observed previously in the infrastructure using Windows log events. It profiles a user based on the set of machines the user commonly logs onto over the training period (e.g., one or two months). Similarly, for each hostname, it finds the set of users that commonly log onto the host. A history is built of {user, host} login events observed during training. Then during detection, new logins are identified and flagged (defined as new {user, host} login events not already in the history). The sensor 30-2 outputs in its report the new logins events found during detection.

After-Hours Sensor (Not Shown)

The goal of this sensor is to identify human-like activities generated by a machine when the user is not at the terminal. During the training period, a pattern of regular working hours is built per user. In addition, a whitelist of domains contacted by many different machines at night (corresponding to automated processes) is created. The output of the sensor is a report containing a list of hosts and non-whitelisted web domains contacted outside regular working hours.

New Applications Sensor 30-3

The goal of this sensor is to profile installed software/applications on a host. This may be done using user-agent string fields in HTTP requests that are recorded in security gateway proxy logs, for example. During the training period, a history including the list of all observed user-agent strings for each host is created. Afterward, new software (corresponding to new user-agent strings) not observed previously is identified. The output is a list of suspicious hosts and new (possibly suspicious) applications they have installed.

Internal-Staging (Not Shown)

This sensor profiles the internal communication among enterprise hosts to determine potential staging servers used for gathering data before exfiltrating it to external sites. The sensor can use either firewall logs or records of network traffic analyzers, if available. While firewall logs normally report only basic connection information among different hosts (source and destination IP address and port number, and whether the connection is accepted or denied), network traffic analyzer records provide additional details such as the amount of data transferred in a connection. During training, a map of the communication pattern within the enterprise can be built. This includes pairs of internal hosts communicating and the average volume of traffic observed (if this information is available from traffic analyzer data). In the detection phase, the sensor flags pairs of hosts either initiating communication or deviating from the communication pattern recorded in the map.

Critical Servers Sensor 30-4

The goal of this sensor is to identify critical machines/services in the enterprise network using the firewall logs. During profiling, for each host, the sensor examines its number of incoming and outgoing connections, and whether those connections were allowed or denied. After the training period, it identifies hosts that have a high ratio of incoming/outgoing connections. These are considered servers.

As mentioned, in the top-down component an attack template can be flexibly defined by a human operator as correlating outputs of different sensors 30 using various policies. Examples of operators that can be used when building attack templates using the outputs (reports) of multiple sensors are:

Sensor 1 AND Sensor 2: a certain entity (e.g., host, user or domain) is required to be part of both sensors' outputs;

Sensor 1 OR Sensor 2: a certain entity (e.g., host, user or domain) is required to be part of at least one of the sensors' outputs;

Sensor 1 DIFF Sensor 2: a certain entity (e.g., host, user or domain) is required to be in the output of Sensor 1 but not Sensor 2;

Sensor 1 BEFORE Sensor 2: an entity or event is detected by Sensor 1 before being detected Sensor 2;

MATCH(m,n,Sensor 1, . . . , Sensor n): an entity (e.g., host, user or domain) matches m out of n sensor outputs.

Given a set of reports for various sensors in the system, and an attack template describing known aspects of an attack using statement with operators as above, the correlators 32 generate and output a list of (prioritized) alerts that satisfy the attack template. The priority and score of these alerts is computed based on the priority and score of the alerts generated by each sensor 30 used by the template. The alerts may be presented to a human user (analyst) in a graphical representation. The system may also provide a graphical interface (tool) through which the analyst can provide feedback. For instance, the human analyst may rank each alert according to its indication of a real attack on a 1-10 scale. Based on the analyst feedback, the system is continuously refined by adding new sensors, augmenting reports generated by various sensors, refining attack templates and prioritizing alerts raised by either individual sensors or correlation among multiple sensors.

Figure 3:
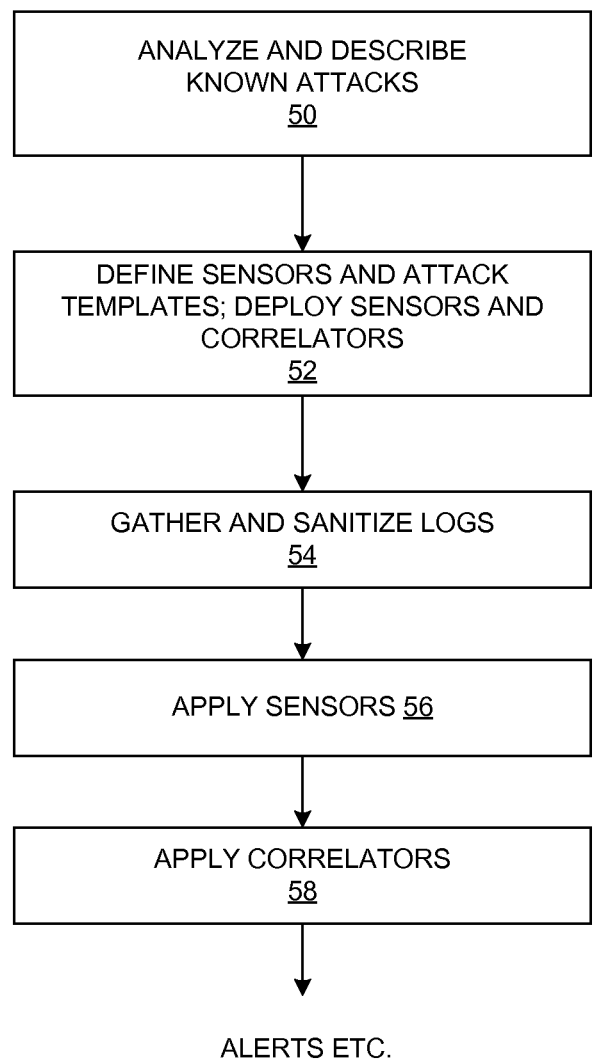
FIG. 3 is a flow diagram of high-level operation of the threat detection system.

FIG. 3 provides a flow chart description of the overall process. At 50, information from known attacks is used to analyze and describe identifying characteristics of attacks to be detected. At 52, the sensors 30 and attack templates are defined, and the sensors 30 and correlators 32 implementing the attack templates are deployed. At 54, the preprocessor 20 obtains and sanitizes the parsed logs 16 from the SIEM system 12. At 56, the sensors 30 are applied to the sanitized logs 24 to generate the sensor reports 34, and at 58 the correlators 32 are applied to the reports 34 to generate output such as alerts etc.

Address Sanitization

As generally known, an IP address can either be static or dynamic. A static IP address is one that is assigned to a particular machine for an indefinitely long time, generally until some event such as network reconfiguration requires address reassignment. This period may be months or years in duration. A dynamic IP address is one that is only temporarily assigned ("leased") to any given machine for a generally much shorter period, and may be assigned to several different machines over different periods. One well-known network protocol for managing the assignment of dynamic IP address is the Dynamic Host Configuration Protocol (DHCP).

Distinguishing between static and dynamic IP addresses is important to the goal of mapping IP addresses to unique hosts. However, in large enterprise networks, documentation about the use and configuration of individual IP address ranges is often scarce or non-existent. While a large subset of dynamic IP addresses (e.g., those administered by the corporate IT department) can be inferred from logs collected from designated DHCP servers, it is much more difficult to identify static IP addresses and also dynamic IP addresses managed by "private" DHCP servers, i.e., local DHCP servers deployed in small or remote networks whose DHCP traffic is not visible to more centralized monitoring systems such as the SIEM system 12.

The following address classification may be used. The set of all network addresses is divided between known dynamic addresses and other addresses, which are further divided into static addresses and other dynamic addresses. Known dynamic IP addresses are those generally managed centrally by the IT department, while other dynamic IP addresses are typically managed by private DHCP servers to which the IT department lacks visibility.

In one embodiment a tool for classifying IP addresses regularly (e.g., daily) extracts all the IP addresses that appear in network logs to create a large enterprise IP address pool. Similarly, it extracts dynamic IP addresses from logs that are known to include only dynamic IP addresses, such as the logs from IT-managed DHCP servers collected by the SIEM system 12. By taking the difference between these two IP address pools, resolving the names of the hosts assigned to the resulting IP addresses, and continuously monitoring those hosts for IP address re-assignments, the tool automatically maintains up-to-date and self-correcting lists of static IP addresses and other dynamic IP addresses.

Figure 4:
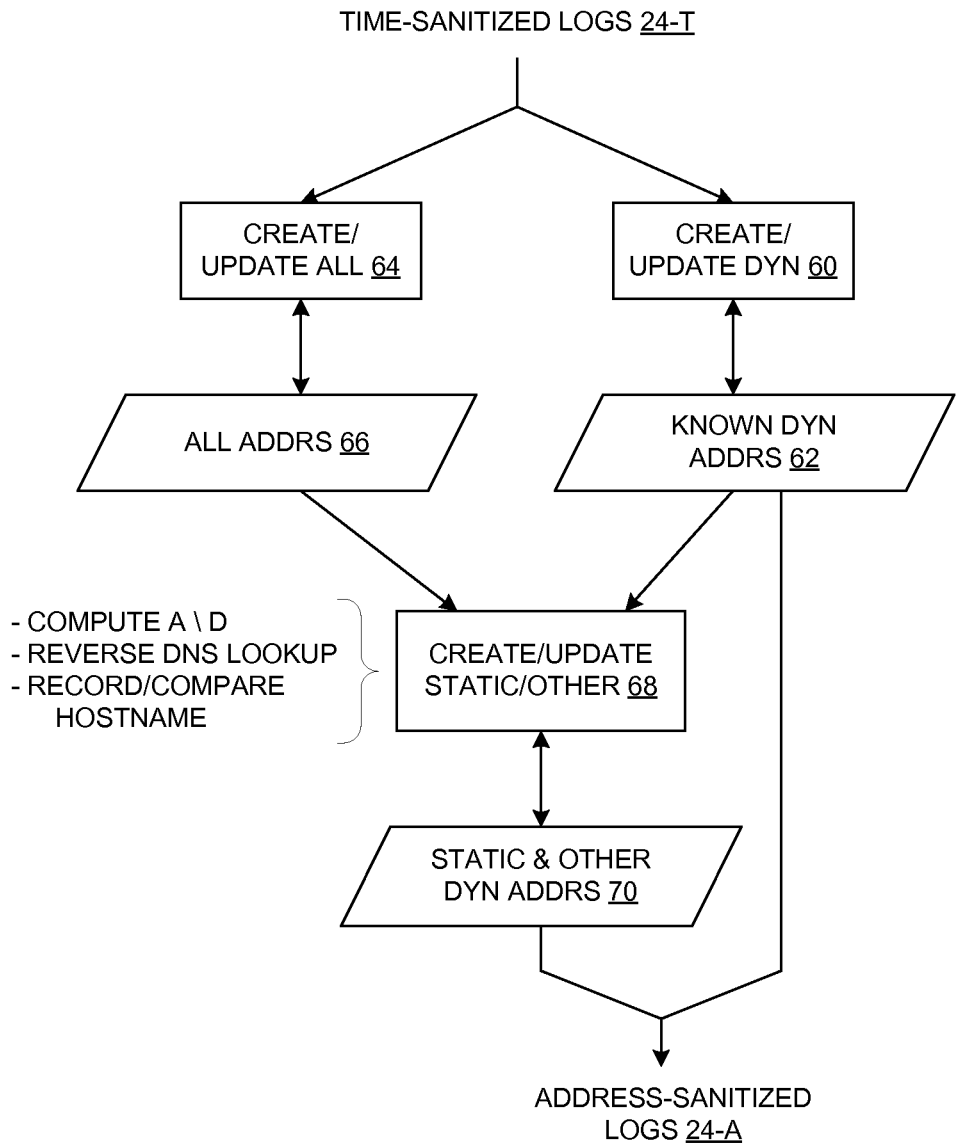
FIG. 4 is a flow diagram of an address sanitization process.

Address sanitization is described with reference to FIG. 4. In general, the address sanitizer 42 may be designed to perform a one-time bootstrap cycle to initialize its operations and data, and then run a periodic (e.g., daily) update cycle. These two separate cycles are both explained below with reference to FIG. 4. As shown, the process operates using the data from the time-sanitized logs 24-T. Further below is a brief description of operation of the time sanitizer 40 in creating those logs.

BOOTSTRAP Cycle

During this cycle, the tool builds its IP address pools and identifies a set of "undetermined" (but potentially static) IP addresses.

1. At 60, create a set 62, referred to as D, of known dynamic IP addresses by extracting the IP addresses that appear in sanitized DHCP and VPN logs.
2. At 64, create a set 66, referred to as A, of all IP addresses internal to the enterprise by extracting the IP addresses that appear in logs from various other network devices (e.g., IronPort Logs, Windows Event logs).
3. At 68, create a set 70, referred to as S, as the difference between A and D. This is the set of undetermined (but potentially static) IP addresses, S=A\D. As shown, this process includes the following:
   Compute A\D
   Perform a reverse DNS lookup for every IP address in S
   Record the hostnames for the IP addresses as returned by DNS As shown, the combination of the set 62 of known dynamic IP addresses and the set 70 of static and other dynamic IP addresses make up the address-sanitized logs 24-A that are provided to the monitor/analyzer 22 for use in the system monitoring/analysis functions.

UPDATE Cycle

The tool automatically runs an UPDATE cycle at regular intervals, e.g., daily, in order to update the IP address pools and classify IP addresses in the set 70 as static or dynamic.

1. At 60, create a new set of known dynamic IP addresses Dnew for that day by extracting the IP addresses that appear in DHCP and VPN logs. Merge with the existing set to create an updated set 62 of known dynamic IP addresses containing the new and old addresses, Dupdated=Dnew∪Dold.
2. At 64, create a new set of all IP addresses Anew by extracting the IP addresses that appear in logs from various other network devices (e.g., IronPort Logs, Windows Event logs). Merge with the old set to create an updated set 66 of all IP addresses containing the new and old addresses, Aupdated=Anew∪Aold.
3. At 68, update the set 70 of static and other dynamic IP addresses:
   a) Compute the difference between Aupdated and Dupdated and create an updated set 70 of undetermined (but potentially static) IP addresses S=Aupdated\Dupdated.
   b) Perform a reverse DNS lookup for every IP address in the set S and record the corresponding hostname
   c) For each IP address in S that was also observed in a previous bootstrap or update cycle, compare its previously resolved hostname with the newly resolved name:
      i) If they differ (i.e., the host changed IP addresses), classify the IP address as other dynamic (i.e., the host is not using a static IP address, and likely being managed by a DHCP server into which the IT department lacks visibility). Move the IP address into the set of previously unknown dynamic IP addresses, Dunknown
      ii) If they are the same, the IP address is kept in S.

The tool may be designed to auto-correct its outputs over time. The longer an IP address is monitored, the higher the confidence in its classification.

Ideally, a mapping between IP addresses and corresponding unique hosts should include the following information: The IP address, a unique identifier for the host, and the start and end timestamps of the period during which the host is assigned this IP address. In one embodiment, the MAC address of a host's network interface is used as the unique identifier for the host.

In contrast to static IP addresses, which are permanently assigned to the same machine, dynamic IP addresses are allocated to different machines at different time periods. This process takes place over the DHCP protocol. In DHCP, dynamic IP addresses are leased to hosts for a given time period, after which the host must renew its IP assignment request, otherwise the DHCP server may reclaim that IP for use by another host. DHCP logs collected by the SIEM system 12 may be parsed to collect information usable to construct a mapping of the known dynamic IP addresses 62 to unique hosts.

Time Sanitization

It is assumed that a list of all logging devices that report to the SIEM system 12 is known (e.g., a list of IP addresses of all logging devices). It is also assumed that the log timestamp translation is done after the logs are collected by the SIEM system 12, i.e., administrator privileges to the logging devices are not available, so that the devices' clock configurations cannot be modified.

The output of the time sanitization technique is the time zone configuration of each logging device. This is stored in the following format:

| Field Name | Description |
| --- | --- |
| Paddr | IP address of the logging device |
| δ | Time difference (UTC - device, to nearest 15 minute interval) |

Given the above information for each logging device, all log timestamps can be translated into UTC by adding the corresponding δ value to the device timestamp. For example, if a log from a device has a timestamp of T2, the adjusted log timestamp for that log message becomes T2+δ.

Figure 5:
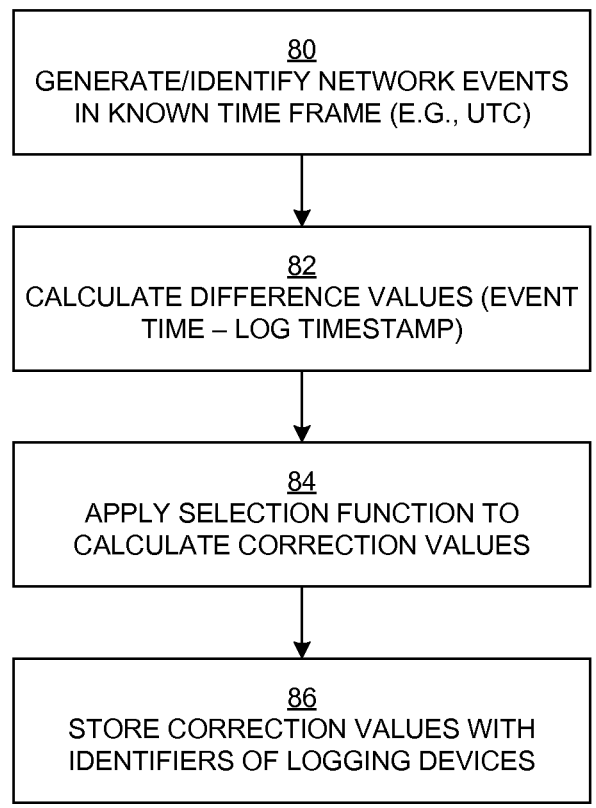
FIG. 5 is a flow diagram of a time sanitization process.

FIG. 5 describes the general procedure by which the timestamp correction values δ are determined. At 80, network events occurring in a known time frame (e.g., UTC) are either generated or simply identified (if existing by action of a separate mechanism). Examples of both operations are given below. The network events are known to have corresponding entries with timestamps in the parsed logs 16. At 82, difference values are calculated, each being a difference between an event time in the known time frame and a timestamp of the parsed log entry. At 84, a selection function is applied to the difference values to obtain a correction value for each logging device. At 86, the correction values are stored in association with respective identifiers of the logging devices (e.g., the IP address values Paddr).

Two different approaches are described for the general process of FIG. 5.

1. Active Approach

One direct approach to detect a device's configured time zone is to send it "probes" over the network soliciting responses containing clock information. This is difficult in practice because neither the IP, UDP, or TCP headers include timestamps. Also, for security reasons many machines ignore packets sent to unused ports.

In an alternative active approach, rather than contacting a logging network device directly, events are generated that will be logged (and time-stamped) by the device. For example, a Windows domain controller validates user logon events and generates logs describing the outcome of the logon attempts as it does so. Thus, log entries and timestamps can be created by performing logons. As another example, a web proxy forwards clients' HTTP requests and generates logs describing the network connection at the same time. Log entries and timestamps can be created by issuing HTTP requests.

Let the known time at which a testing event E is generated be TE, which is represented in UTC time. After the logging device processes this event, a log message is created with the device's timestamp TD. In terms of elapsed time, the difference between TE and TD is very small, e.g., on the order of milliseconds, because the same device often performs event processing and log generation. This is true in both the above examples (Windows domain controller, web proxy).

The difference value $\delta$=TD−TE can be calculated, rounded off to the nearest 15 minutes (since that is the level of granularity at which time zones are set). Since TE is represented in UTC time, the device's time zone is hence known to be configured as UTC time−$\delta$.

2. Passive Approach

While the active approach can be quite accurate and efficient, it may not be suitable for use in a large network with many different logging devices. In this case, events may be directed to different processing/logging devices depending on the source host's geographic location or network configuration. Without a comprehensive understanding of the topology of the enterprise network and access to multiple distributed client machines, the active approach may become infeasible.

An alternative passive approach may leverage information available in logs collected by a SIEM system to determine the devices' clock configuration. The clock configuration in the SIEM system 12 may be static, which simplifies the processing. For example, the SIEM system 12 may generate all its timestamps in UTC time.

At a high level, the passive approach compares the device timestamp TD with the SIEM system timestamp TS for all log messages generated by a device, where the SIEM system timestamp TS reflects the time that the SIEM system 12 received the log messages. Let $\delta$ be the difference between TD and TS, rounded off to the nearest 15 minutes. From a set of (possibly inconsistent) $\delta$ values derived from all logs generated by a device over a certain time period (e.g., one month), a process is employed to determine the correct actual time correction value for the device.

Figure 6:
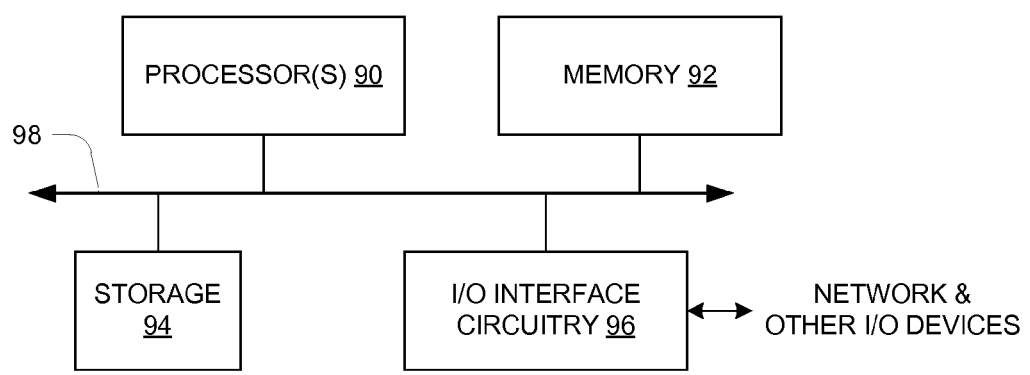
FIG. 6 is a hardware block diagram of a computer.

FIG. 6 is a generalized depiction of a computer such as may be used to realize the computers in the system, including hosts of the protected system 10 whose activities are monitored as well as computers implementing the SIEM system 12 and threat detection system 18. It includes one or more processors 90, memory 92, local storage 94 and input/output (I/O) interface circuitry 96 coupled together by one or more data buses 98. The I/O interface circuitry 96 couples the computer to one or more external networks, additional storage devices or systems, and other input/output devices as generally known in the art. System-level functionality of the computer is provided by the hardware executing computer program instructions (software), typically stored in the memory 92 and retrieved and executed by the processor(s) 90. Any description herein of a software component performing a function is to be understood as a shorthand reference to operation of a computer or computerized device when executing the instructions of the software component. Also, the collection of components in FIG. 6 may be referred to as "processing circuitry", and when executing a given software component may be viewed as a function-specialized circuit, for example as an "analyzer circuit" when executing a software component implementing an analyzer function.

Two specific examples are now given to illustrate the operation of the threat detection system 18.

I. MATCH(3,4,C&C, New-Logins, After-Hours, Internal-Staging)

This template could be indicative of an APT attack consisting of the four stages documented in the literature: (1) Exploitation, (2) Command-and-control, (3) Lateral movement, (4) Data exfiltration. The template requires that an entity be found in three out of four reports from respective sensors 30. The "C & C" sensor output corresponds to phases (2) and/or (4); "New-logins" can be mapped to phase (3); "After-hours" could be connected to phase (2) or (4); and "Internal-staging" to phase (4) of the attack.

Since each APT attack proceeds uniquely, the above template does not require an exact match of all these sensors, but rather a relaxed 3-out-of-4 sensor matches. The alerts generated by this template contain highly suspicious hosts that should be further investigated by a human analyst.

II. C & C BEFORE New-Logins from the Same Host

This template correlates users who contact new domains and subsequently log in to a machine they have never accessed in the past. This succession of steps is also highly indicative of an APT attack. For instance: an internal host under the control of the attacker contacts a new domain (corresponding to a C & C server); the attacker obtains the credentials of the users typically logging in to the compromised host; the attacker then decides to use one of the compromised user credentials to perform lateral movement and obtain access to other internal hosts/servers.

In more detail, the output of this attack template is determined as follows:

1) Training: Build a history of users and the hosts that the users logged into over a profiling period of Tp days. Build a history of hosts and the web domains they contact over the same profiling period of Tp days.

2) New-login Sensor: For a detection window of Td days, for each day, find new operating system logins that were not observed over the profiling period. These are the suspicious users.

3) C & C Sensor: Find new web domains that were not contacted over the profiling period. These are the suspicious domains. Let the first time (or last time) host h contacted a suspicious domain be denoted as t1,h (or t2,h). Only consider domains where t1,h!=t2,h.

4) Correlation:
   a. For each host that contacted a suspicious domain, find all users that previously logged on to that host. Refer to this set of users as U.

b. Find users in U that also performed a new login in the detection window, and where the new login by user u took place AFTER t1,A, where A is a machine user u has logged on in the training period. Refer to this set of users as U'.

5) Output:
a. Return the set U'.
b. Return the set H' of hosts that user u (in U') logged onto in the training period, and the suspicious domains those hosts contacted. It may be desirable to consider only the first new login by user u to host h. If user u logged onto host h again in the detection window, the same information is not returned redundantly.
c. Return the connection rate for domains contacted by hosts in H'. The rate, for host h and domain d, is defined as (the number of connections to d from h)/(t2,h−t1,h).

Further filtering can be applied to domains (and users) based on the domains' connection rate. Such a threshold may be an adjustable threshold that can be tuned by an analyst.

While various embodiments of the invention have been particularly shown and described, it will be understood by those skilled in the art that various changes in form and details may be made therein without departing from the spirit and scope of the invention as defined by the appended claims.

What is claimed is:

1. A threat detection system for detecting threat activity in a protected computer system, the threat detection system including one or more computers storing and executing computer program instructions of a threat detection application to cause the computers to realize components of the threat detection system, the components of the threat detection system comprising:
a set of anomaly sensors of a plurality of distinct types including user-activity sensors, host-activity sensors and application-activity sensors, each sensor being operative (1) to build a history of pertinent activity over a training period of operation, and (2) during a subsequent detection period of operation, compare current activity to the history of pertinent activity to detect new activity not occurring in the training period, the new activity being identified in respective sensor output, wherein the host-activity sensors include at least one internal staging sensor operative to i) build a history of communication activity between hosts located within the protected computer system during the training period of operation, and ii) compare current communication activity between hosts within the protected computer system to the history of communication activity between hosts within the protected computer system during the subsequent detection period of operation to detect gathering of data within the protected computer system prior to exfiltration of the data from the protected computer system to a site external to the protected computer system; and
a set of correlators of a plurality of distinct types corresponding to different stages of threat activity according to modeled threat behavior, each correlator receiving output of one or more sensors of different types and applying logical or temporal testing to received sensor outputs to detect activity patterns of the different stages, each correlator using results of the logical or temporal testing to generate a respective alert output for a human or machine user of the threat detection system; and
wherein the internal staging sensor is operative, during the detection period of operation, to flap one of the pairs of hosts located within the protected computer system as gathering data within the protected computer system prior to exfiltration of the data from the protected computer system in response to an average volume of traffic observed between the pair of hosts during the detection period of operation exceeding an average volume of traffic observed between the pair of hosts during the training period.

2. A threat detection system according to claim 1, wherein:
the user-activity sensors include a login sensor for which the pertinent activity includes user-host login events each identifying a user logging in to a respective host computer of the protected computer system;
the host-activity sensors include a command-and-control sensor for which the pertinent activity includes contact to external web domains by hosts of the protected computer system; and
the application-activity sensors include an installed-application sensor for which the pertinent activity includes installation of application software on hosts of the protected computer system.

3. A threat detection system according to claim 1, wherein the training period has a duration of at least one month.

4. A threat detection system according to claim 1, wherein the logical testing includes logical relationships among respective instances of an identifier of a system entity in the outputs of two or more of the sensors.

5. A threat detection system according to claim 4, wherein the logical relationships include logical AND, logical inclusive-OR, and logical DIFFERENCE.

6. A threat detection system according to claim 4, wherein the system entity is selected from the group consisting of host, user and domain.

7. A threat detection system according to claim 1, wherein the temporal testing includes temporal relationships among respective instances of an identifier of a system entity in the outputs of two or more of the sensors.

8. A threat detection system according to claim 7, wherein the logical temporal relationships include BEFORE and AFTER.

9. A threat detection system according to claim 1, wherein activity information about the pertinent activity is provided to the sensors via logs generated by respective components of the protected computer system.

10. A threat detection system according to claim 9, wherein the components of the protected computer system include one or more of Web proxies, firewalls, domain controllers, virtual private network (VPN) component and Dynamic Host Control Protocol (DHCP) servers.

11. A threat detection system according to claim 9, wherein the logs are parsed logs, and further comprising a preprocessor operative to generate sanitized logs from the parsed logs, the sanitized logs conveying activity information for activity reflected in the parsed logs with correction for timestamp inconsistencies or host address inconsistencies.

12. A threat detection system according to claim 1, wherein the anomaly sensors are tunable in accordance with feedback information indicating whether the new activity identified in sensor output corresponds to actual threat activity versus normal, non-threat activity.

13. A method of detecting threat activity in a protected computer system, comprising:
operating a set of anomaly sensors of a plurality of distinct types including user-activity sensors, host-activity sensors and application-activity sensors, each sensor (1) building a history of pertinent activity over a training period of operation, and (2) during a subsequent detection period of operation, comparing current activity to the history of pertinent activity to detect new activity not occurring in the training period, the new activity being identified in respective sensor output, wherein the host-activity sensors include at least one internal staging sensor operative to i) build a history of communication activity between hosts located within the protected computer system during the training period of operation, and ii) compare current communication activity between hosts within the protected computer system to the history of communication activity between hosts within the protected computer system during the subsequent detection period of operation to detect gathering of data within the protected computer system prior to exfiltration of the data from the protected computer system to a site external to the protected computer system;

operating a set of correlators of a plurality of distinct types corresponding to different stages of threat activity according to modeled threat behavior, each correlator receiving output of one or more sensors of different types and applying logical or temporal testing to received sensor outputs to detect activity patterns of the different stages, each correlator using results of the logical or temporal testing to generate a respective alert output for a human or machine user of the threat detection system; and wherein the internal staging sensor is operative, during the detection period of operation, to flag one of the pairs of hosts located within the protected computer system as gathering data within the protected computer system prior to exfiltration of the data from the protected computer system in response to an average volume of traffic observed between the pair of hosts during the detection period of operation exceeding an average volume of traffic observed between the pair of hosts during the training period.

14. A method according to claim 13, wherein:

the user-activity sensors include a login sensor for which the pertinent activity includes user-host login events each identifying a user logging in to a respective host computer of the protected computer system;

the host-activity sensors include a command-and-control sensor for which the pertinent activity includes contact to external web domains by hosts of the protected computer system; and the application-activity sensors include an installed-application sensor for which the pertinent activity includes installation of application software on hosts of the protected computer system.

15. A method according to claim 13, wherein the training period has a duration of at least one month.

16. A method according to claim 13, wherein the logical testing includes logical relationships among respective instances of an identifier of a system entity in the outputs of two or more of the sensors.

17. A method according to claim 16, wherein the logical relationships include logical AND, logical inclusive-OR, and logical DIFFERENCE.

18. A method according to claim 16, wherein the system entity is selected from the group consisting of host, user and domain.

19. A method according to claim 13, wherein the temporal testing includes temporal relationships among respective instances of an identifier of a system entity in the outputs of two or more of the sensors.

20. A method according to claim 19, wherein the logical temporal relationships include BEFORE and AFTER.

21. A method according to claim 13, wherein activity information about the pertinent activity is provided to the sensors via logs generated by respective components of the protected computer system.

22. A method according to claim 21, wherein the components of the protected computer system include one or more of Web proxies, firewalls, domain controllers, virtual private network (VPN) component and Dynamic Host Control Protocol (DHCP) servers.

23. A method according to claim 21, wherein the logs are parsed logs, and further comprising a preprocessor operative to generate sanitized logs from the parsed logs, the sanitized logs conveying activity information for activity reflected in the parsed logs with correction for timestamp inconsistencies or host address inconsistencies.

24. A method according to claim 13, wherein the anomaly sensors are tunable in accordance with feedback information indicating whether the new activity identified in sensor output corresponds to actual threat activity versus normal, non-threat activity.

25. A method according to claim 13, wherein:

each user-activity sensor is operative to (i) maintain a history of normal user activity for users of the protected computer system, (ii) create respective user profiles of the user activity based on the history of normal user activity, and (iii) generate user-activity sensor output and provide it to one or more of the set of correlators, the user-activity sensor output identifying anomalous user activity deviating from the respective user profile of user activity;

each host-activity sensor is operative to (i) maintain a history of normal host activity for host computers of the protected computer system, (ii) create respective host profiles of the host activity based on the history of normal host activity, and (iii) generate host-activity sensor output and provide it to one or more of the set of correlators, the host-activity sensor output identifying anomalous host activity deviating from the respective host profile of host activity; and each application-activity sensor is operative to (i) maintain a history of normal application activity for application programs of the protected computer system, (ii) create respective application profiles of the application activity based on the history of normal application activity, and (iii) generate application-activity sensor output and provide it to one or more of the set of correlators, the application-activity sensor output identifying application activity deviating from the respective application profile of application activity.

26. A method according to claim 25, wherein:

the user-activity sensor uses first statistical or machine learning techniques in creating the user profiles;

the host-activity sensor uses second statistical or machine learning techniques in creating the host profiles; and the application-activity sensor uses third statistical or machine learning techniques in creating the application profiles.

27. A method according to claim 13, wherein the internal staging sensor is operative to build the history of communication activity between hosts located within the protected computer system during the training period of operation by building a map of communications within the protected computer system during the training period using a record of at least one network traffic analyzer, wherein the record of the network traffic analyzer includes an amount of data transferred between each pair of hosts located within the protected computer system during the training period of operation; and wherein the map of communications within the protected computer system during the training period includes an average volume of traffic observed during the training period between each pair of hosts located within the protected computer system.

* * * * *